No. 803,556. PATENTED NOV. 7, 1905.
J. A. CHARTER.
POWER DRIVING MECHANISM.
APPLICATION FILED JAN. 30, 1902.
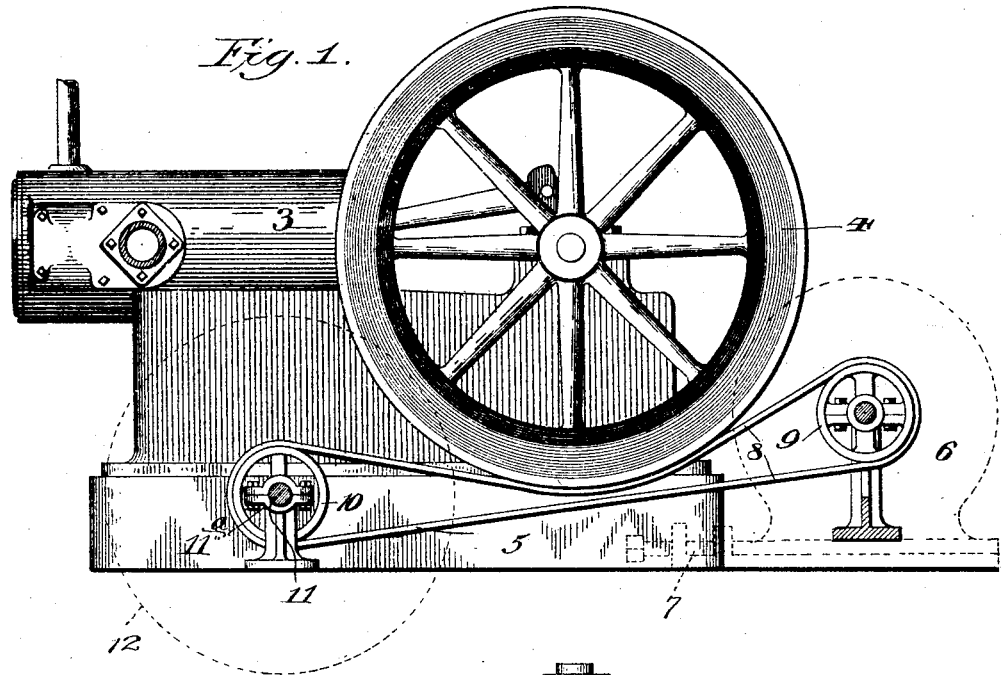
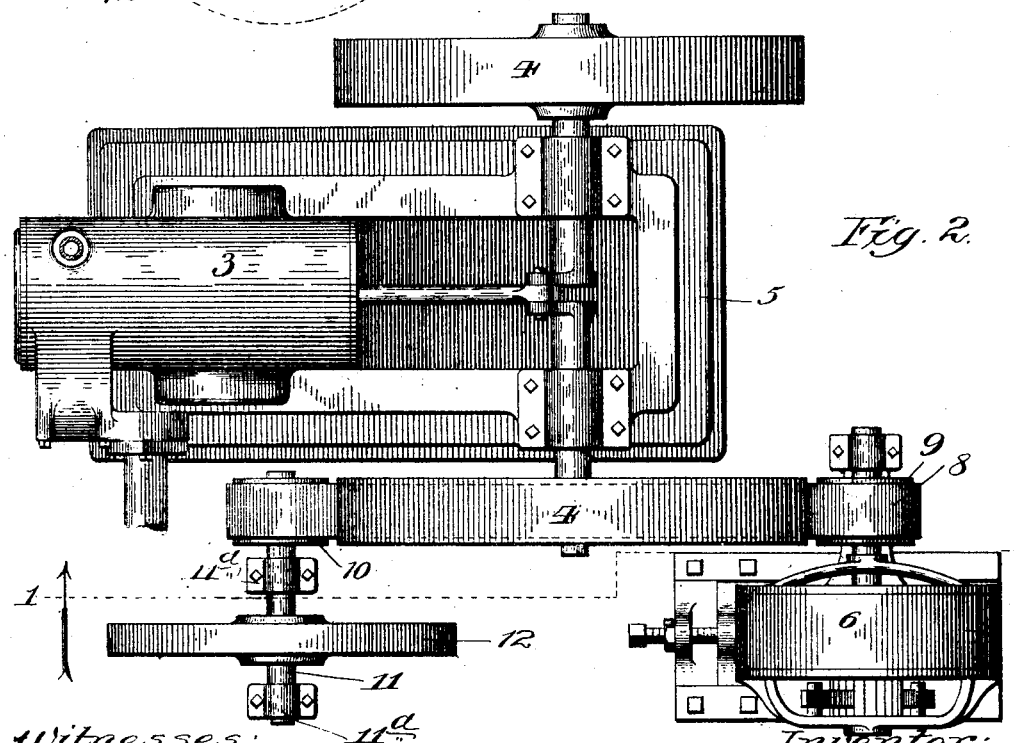

UNITED STATES PATENT OFFICE.

JAMES A. CHARTER, OF CHICAGO, ILLINOIS, ASSIGNOR TO FAIRBANKS, MORSE & COMPANY, OF CHICAGO, ILLINOIS, A CORPORATION OF ILLINOIS.

POWER DRIVING MECHANISM.

No. 803,556.      Specification of Letters Patent.      Patented Nov. 7, 1905.

Application filed January 30, 1902. Serial No. 91,933.

*To all whom it may concern:*

Be it known that I, JAMES ADAMS CHARTER, a citizen of the United States of America, residing in Chicago, in the county of Cook and State of Illinois, have invented certain new and useful Improvements in Power Driving Mechanism, of which the following, taken in connection with the accompanying drawings, is a specification.

This invention has reference to mechanism designed for driving electrical machinery, primarily, such as dynamo electric machines, and is particularly useful where the driving power is a hydrocarbon engine, or other prime mover, which has not very great constancy of speed.

In order to get a better understanding of my invention it will be well to consider the same in connection with the accompanying drawings, in which I have illustrated it in preferred form, and in which—

Figure 1 is a side elevation of an apparatus embodying my improvements, taken with parts shown in section on the line 1 of Figure 2, and Figure 2 is a plan view of the same.

A gas engine, which may be of any preferred construction, I have illustrated at 3, the balance wheels of which 4 overhang somewhat at the sides of the engine frame 5.

Adjacent to the engine is a dynamo 6, which has an adjusting device 7 for moving it, and taking up the slack of a belt 8 which runs over the dynamo pulley 9, and in contact on its upper face with the under side of the pulley 4, as shown in Figure 1, and at the opposite end over a pulley 10, which is keyed to a shaft 11, on which is mounted a secondary or supplemental balance wheel 12. The pulley 10 is of smaller diameter than the balance wheel 4, the purpose of which will be more apparent from a consideration of the operation of the device, which I will now give, and which is as follows:

Assuming the balance wheel to be in motion, in a direction to drive the dynamo 6, and the belt 8 to be in contact with the under periphery of the said balance wheel, by proper adjustment of the device 7, the driving effect of the belt will obviously be transmitted, not only to the dynamo 6, through its pulley 9, but also to the pulley 10 and shaft 11, and thence to the supplemental balance wheel 12, which, because of the relatively small size of the pulley 10, compared with the balance wheel 4, will receive a much higher speed of rotation than the balance wheel 4, and which, on this account, is capable of storing up considerably more energy in proportion to its weight, than is the balance wheel 4.

The supplemental balance wheel 12 being preferably carried on the shaft 11, and the shaft 11 mounted in bearings $11^a$, which are secured firmly in some manner adjacent to the driving engine, the strains incident to the use of the supplemental balance wheel 12 are not imparted to the other portions of the mechanism, although the balance wheel 12, through the belt 8, exerts a marked beneficial effect in maintaining a regular speed and power of the prime mover upon the dynamo, which is very important in the maintenance of a constant current, as is well known to those skilled in the electrical art.

Having thus described my invention, what I claim as new, and desire to secure by Letters Patent, is—

The combination of an engine shaft, a fly wheel and pulley thereon, a driven shaft, a supplemental shaft, a fly wheel and a pulley thereon much smaller than the engine pulley, and a belt connecting said supplemental pulley to the driven shaft, partly engaging and being frictionally driven by the engine pulley, whereby the supplementary fly wheel rotates faster than the engine fly wheel and pulley and acts as an equalizing governor between the engine pulley and the frictionally driven machine.

In testimony whereof I have hereunto set my hand in the presence of two subscribing witnesses.

JAMES A. CHARTER.

Witnesses:
PAUL SYNNESTVEDT,
PHILIP J. FINNEGAN.